(12) United States Patent
Taniguchi et al.

(10) Patent No.: US 8,349,501 B2
(45) Date of Patent: *Jan. 8, 2013

(54) NON-AQUEOUS ELECTROLYTE SECONDARY BATTERY

(75) Inventors: Akihiro Taniguchi, Hyogo (JP); Kensuke Nakura, Osaka (JP); Takashi Takeuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 1592 days.

This patent is subject to a terminal disclaimer.

(21) Appl. No.: 11/595,897

(22) Filed: Nov. 13, 2006

(65) Prior Publication Data

US 2007/0166624 A1   Jul. 19, 2007

Related U.S. Application Data

(63) Continuation-in-part of application No. 11/451,309, filed on Jun. 13, 2006.

(30) Foreign Application Priority Data

Jan. 18, 2006   (JP) .................. 2006-010105

(51) Int. Cl.
*H01M 6/16* (2006.01)
*H01M 6/18* (2006.01)
*H01M 4/58* (2010.01)

(52) U.S. Cl. ........ 429/338; 429/337; 429/336; 429/324; 429/322; 429/321; 429/231.95; 429/231.9

(58) Field of Classification Search .................. 429/223, 429/218.1, 231.95, 188, 321, 322, 330, 231, 429/338, 337, 336, 324, 231.9

See application file for complete search history.

(56) References Cited

U.S. PATENT DOCUMENTS

| 6,241,959 | B1 * | 6/2001 | Cho et al. .................... 423/594.4 |
| 6,291,107 | B1 * | 9/2001 | Shimizu ........................ 429/324 |
| 6,492,064 | B1 * | 12/2002 | Smart et al. .................... 429/330 |
| 6,534,216 | B1 * | 3/2003 | Narukawa et al. ............ 429/224 |
| 2003/0113636 | A1 | 6/2003 | Sano et al. |
| 2003/0134200 | A1 * | 7/2003 | Tanaka et al. .............. 429/231.1 |
| 2008/0014497 | A1 | 1/2008 | Sano et al. |

FOREIGN PATENT DOCUMENTS

| CN | 1411092 A | 4/2003 |
| JP | 11300180 | 11/1999 |
| JP | 2000-123870 A | 4/2000 |
| JP | 2000-195557 A | 7/2000 |
| KR | 10-2003-0081160 | 10/2003 |
| KR | 10-2004-0075199 | 8/2004 |

OTHER PUBLICATIONS

Korean Office Action with English Translation issued in Korean Patent Application No. 10-2006-0138568 dated on Apr. 10, 2008.
Chinese Office Action issued in Chinese Patent Application No. CN 200610166944.1, dated May 9, 2008.
Doron Aurbach et al., "The Study of Surface Phenomena Related to Electrochemical Lithium Intercalation into $Li_xMO_y$ Host Materials (M = Ni, Mn)," Journal of Electrochemical Society, 2000, pp. 1322-1331, vol. 147 (4), The Electrochemical Society Inc.
United States Office Action issued in U.S. Appl. No. 11/451,309 dated Dec. 3, 2009.
United States Office Action issued in U.S. Appl. No. 11/451,309 dated May 26, 2010.

* cited by examiner

*Primary Examiner* — Helen O Conley
(74) *Attorney, Agent, or Firm* — McDermott Will & Emery LLP

(57) ABSTRACT

A non-aqueous electrolyte secondary battery including: an electrode group in which a positive electrode and a negative electrode are spirally wound with a separator interposed therebetween; and a non-aqueous electrolyte including a non-aqueous solvent and a lithium salt dissolved in the non-aqueous solvent, the positive electrode including a positive electrode material mixture layer containing a nickel-containing lithium composite metal oxide, wherein a product of A and B equals 150 to 350, A equals 15 to 20%, and B equals 8 to 25%, where A (%) represents a porosity of the positive electrode material mixture layer, and B (%) represents a volume percentage of ethylene carbonate in the non-aqueous solvent.

2 Claims, No Drawings

NON-AQUEOUS ELECTROLYTE SECONDARY BATTERY

CROSS-REFERENCE TO RELATED APPLICATIONS

This application is a continuation-in-part of U.S. patent application Ser. No. 11/451,309 filed on Jun. 13, 2006, the disclosure of which is incorporated herein by reference.

FIELD OF THE INVENTION

The present invention relates to a non-aqueous electrolyte secondary battery, and more particularly to an improvement of safety.

BACKGROUND OF THE INVENTION

With the widespread of smaller and lighter weight electronic equipment such as cell phones and notebook computers in recent years, demand is growing for higher capacity secondary batteries as the power sources therefor. Non-aqueous electrolyte secondary batteries, which include: a positive electrode whose active material is a lithium cobalt oxide (e.g., $LiCoO_2$); and a negative electrode comprising a carbon material, have been developed for such application and are now widely used.

$LiCoO_2$, however, is very costly since it contains Co. For this reason, as an alternative to $LiCoO_2$, various other metal oxides are proposed and vigorously studied. Examples of such metal oxides include: $LiNiO_2$; $LiNi_{1-x}Co_xO_2$ obtained by partially replacing Ni in $LiNiO_2$ with Co; and $LiMn_2O_4$.

Particularly, a positive electrode whose active material is a lithium composite oxide containing nickel as an essential element (hereinafter simply referred to as a nickel-containing oxide), such as $LiNiO_2$ and $LiNi_{1-x}Co_xO_2$, can offer higher energy density than a positive electrode whose active material is a lithium cobalt oxide. Accordingly, the use of positive electrode comprising a nickel-containing oxide enables low cost production and provides a non-aqueous electrolyte secondary battery with improved capacity characteristic.

However, the positive electrode comprising a nickel-containing oxide has lower thermal stability than the positive electrode comprising a lithium cobalt oxide, and thus the resulting battery has the disadvantage of poor safety.

As one approach for improving safety, Japanese Laid-Open Patent Publication No. 2000-195557 (hereinafter referred to as Patent Document 1) proposes a battery that satisfies a relation: 0.2<C3/C1<0.8 in a region of 45<P/S, where P (mAh) represents battery nominal capacity, S (cm$^2$) represents battery surface area, C1 (mAh) represents discharge capacity discharged at P (mA), and C3 (mAh) represents discharge capacity discharged at 3×P (mA). This publication also proposes to produce a positive electrode whose active material layer has a density of not less than 3.2 g/cm$^3$ in order to achieve the above relation.

As another approach, although silent on positive electrode active material, Japanese Laid-Open Patent Publication No. 2000-123870 (hereinafter referred to as Patent Document 2) proposes a solvent for non-aqueous electrolyte comprising ethylene carbonate and methyl ethyl carbonate at a volume percentage of not less than 10% and not greater than 30%, and not less than 50% and not greater than 90%, respectively. According to this publication, when the content of ethylene carbonate is less than 10%, the effect of forming a protection film on the surface of negative electrode active material is reduced. When the content of methyl ethyl carbonate, which has low viscosity and a low boiling point, exceeds 90%, the resulting battery may generate heat due to a short-circuit, increasing the possibility of explosion.

It is generally accepted that the positive electrode whose active material is a nickel-containing oxide containing nickel as an essential element lacks safety because the active material has poor thermal stability. If a short-circuit occurs inside a fully charged battery, a large current will flow locally into the shorted area, thereby generating heat due to Joule heat.

In nail penetration test (one of the safety tests) in which a nail is penetrated through a battery, the most dangerous situation occurs when a positive electrode current collector and a negative electrode material mixture layer come into contact with each other. When a nail is penetrated through a battery, the positive electrode active material layer separates from the positive electrode current collector at the penetrated area, allowing the bare current collector to come into contact with the negative electrode active material layer through the nail, causing excessive heat generation.

In a battery comprising a nickel-containing oxide, it is difficult to prevent excessive heat generation under such conditions as in nail penetration test only by increasing the density of the positive electrode active material to a certain level as disclosed by Patent Document 1. Moreover, as described in Patent Document 1, increasing the density of the positive electrode active material results in a decrease in high rate discharge performance.

Likewise, only combining a battery whose positive electrode active material is a nickel-containing oxide with the electrolyte disclosed by Patent Document 2 (i.e., the electrolyte comprising ethylene carbonate and methyl ethyl carbonate at a volume percentage of not less than 10% and not greater than 90%, respectively) cannot prevent excessive heat generation. Nickel-containing oxides have the disadvantage of low thermal stability. Although the cause has not been determined, the following inherent characteristics of nickel-containing oxides are presumed responsible for low thermal stability. Specifically, a high valence metal oxide decomposes at high temperatures and releases oxygen. The thermal decomposition temperature of positive electrode active material tends to be influenced by the charge state of battery (i.e., the amount of lithium contained in positive electrode). In other words, positive electrode active material tends to decompose more easily as the amount of lithium is reduced. In a nickel-containing oxide, because the amount of lithium is small, the crystal tends to be unstable. When a nickel-containing oxide and a cobalt-containing oxide both having an equal amount of lithium are compared, nickel-containing oxide is thermodynamically more unstable and thus easily releases oxygen.

SUMMARY OF THE INVENTION

An object of the present invention is to improve a non-aqueous electrolyte secondary battery comprising a positive electrode containing a nickel-containing oxide so as to ensure its safety without sacrificing its high rate discharge performance, thereby providing a battery which is excellent in safety and battery characteristic.

A non-aqueous electrolyte secondary battery of the present invention comprises: an electrode group in which a positive electrode and a negative electrode are spirally wound with a separator interposed therebetween; and a non-aqueous electrolyte comprising a non-aqueous solvent and a lithium salt dissolved in the non-aqueous solvent, the positive electrode including a positive electrode material mixture layer comprising a nickel-containing lithium composite metal oxide as an active material, and is characterized in that a product of A and B equals 150 to 350, A equals 15 to 20%, and B equals 8 to 25%, where A (%) represents a porosity of the positive electrode material mixture layer, and B (%) represents a volume percentage of ethylene carbonate in the non-aqueous solvent.

The nickel-containing lithium composite metal oxide used in this invention is preferably represented by a formula: $LiNi_xM_yL_zO_2$, where M is at least one selected from Co and Mn, L is at least one selected from the group consisting of Al, Mg, Ca, Si and Ti, $0.3 \leq x \leq 0.9$, $0.1 \leq y \leq 0.5$, and $0.005 \leq z \leq 0.1$.

Electrolytes for use in non-aqueous electrolyte secondary batteries are usually mixtures of a cyclic carbonate such as ethylene carbonate and a chain carbonate. Cyclic carbonates have a high dielectric constant and high viscosity whereas chain carbonates have a low dielectric constant and low viscosity. Accordingly, in order to yield an electrolyte having high ion conductivity, they are usually mixed such that the volume ratio of cyclic carbonate and chain carbonate is 1:4 to 5:5 and that the volume percentage of ethylene carbonate is 20 to 40%.

Investigations made by the present inventors have revealed that, in a positive electrode whose active material is a nickel-containing oxide, the correlation between the porosity of the material mixture layer and the amount of ethylene carbonate has a significant effect on battery's safety. This can be explained as follows.

The positive electrode material mixture layer containing a nickel-containing oxide has the disadvantage that it easily separates from a current collector. This is presumably caused by a film derived from ethylene carbonate which is formed on the surface of the nickel-containing oxide. More specifically, the film formed on the surface of the active material impairs the adhesion between the active material and the current collector, resulting in easy separation of the material mixture layer. Further, the inventors found that the nickel-containing oxide readily forms a film derived from ethylene carbonate upon contact with ethylene carbonate. This is presumably because a ring-opening and polymerization of ethylene carbonate represented by the following formula is repeated (see D. Aurbach et al., J. Electrochem. Soc., 147(4), 1322-1331 (2000)):

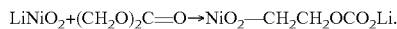

$LiNiO_2 + (CH_2O)_2C=O \rightarrow NiO_2—CH_2CH_2OCO_2Li$.

This reaction occurs only in a nickel-containing oxide, and it does not occur in other oxide such as a cobalt-containing oxide.

If a positive electrode material mixture layer separates from a positive electrode current collector when a nail is penetrated through a battery, the positive electrode current collector becomes bare around the area through which the nail is penetrated, allowing the current collector to easily come into contact with a negative electrode active material through the nail. Because the positive electrode current collector has a low resistance value, a large current flows intensely to the shorted area, and the battery enters a heating mode, generating excessive heat. Accordingly, in a battery including a nickel-containing oxide, it is necessary to prevent excessive heat generation by minimizing the amount of ethylene carbonate so as to prevent the formation of a film derived from ethylene carbonate on the surface of the positive electrode active material layer, in other words, to prevent the separation of the material mixture layer.

It is also effective to form a structure whereby the positive electrode material mixture layer does not easily separate from the current collector. Specifically, when the positive electrode current collector having a paste for forming positive electrode material mixture layer applied thereto and dried is subjected to a rolling step, the degree of rolling should be increased so as to reduce the porosity of the positive electrode material mixture layer. This embeds (or sinks) the active material in the current collector.

In view of the above, in the present invention, in a high capacity non-aqueous electrolyte secondary battery whose positive electrode active material is a lithium composite metal oxide containing nickel as an essential element, both the porosity of the positive electrode material mixture layer and the amount of ethylene carbonate contained in the electrolyte are adjusted to appropriate levels as described above, whereby the separation of the positive electrode material mixture layer from the positive electrode current collector is prevented. Accordingly, even if a short-circuit occurs as in nail penetration test, the contact between the positive electrode current collector and the negative electrode active material can be prevented, and thus excessive heat generation of the battery can be prevented.

The positive electrode active material preferably comprises secondary particles comprising agglomerated primary particles and having protrusions on the surface of the secondary particles, so as to allow the positive electrode active material to easily embed itself in the positive electrode current collector.

According to the present invention, in a high capacity non-aqueous electrolyte secondary battery whose positive electrode active material is a lithium composite metal oxide containing nickel as an essential element, the separation of the positive electrode material mixture layer from the current collector, as well as the contact between the positive electrode current collector and the negative electrode active material, can be prevented.

By decreasing the volume percentage of ethylene carbonate contained in the non-aqueous solvent as the porosity of the positive electrode material mixture layer is increased, ignition and combustion can be prevented.

As a result, even if a nail is penetrated through the battery, excessive heat generation can be prevented, thereby providing a high capacity non-aqueous electrolyte secondary battery having improved quality.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

A non-aqueous electrolyte secondary battery of the present invention comprises an electrode group in which a positive electrode, a negative electrode and a separator for separating the positive and negative electrodes from each other are spirally wound. The electrode group is housed, along with a non-aqueous electrolyte, in a battery case having a predetermined shape. The shape of the battery case is not specifically limited. Commonly used are cylindrical and prismatic battery cases. When the battery case has a cylindrical shape, the electrode group should be formed into a column. When the battery case has a prismatic shape, the electrode group should be formed to have a substantially oval cross section.

The positive electrode comprises a positive electrode material mixture layer and a positive electrode current collector carrying the material mixture layer. The positive electrode current collector is preferably a strip-shaped metal foil (e.g., aluminum foil). The positive electrode material mixture layer is carried on each surface of the positive electrode current collector except one portion of the current collector. The portion of the positive electrode current collector serves as a lead connecting portion or current collecting portion. Because the positive electrode material mixture layer is not formed on the lead connecting portion or current collecting portion, the positive electrode current collector is bare. In order to achieve a smaller and lighter weight battery, the positive electrode current collector preferably has a thickness of 10 to 25 μm. The positive electrode material mixture layer comprises a positive electrode active material and a binder. Other than the positive electrode active material and the binder, the positive electrode material mixture layer may further comprise, for example, a conductive material.

The positive electrode material mixture layer preferably has a porosity of 15 to 20%. If the positive electrode material mixture layer has a porosity exceeding 20%, the degree to which the positive electrode active material particles are embedded in the current collector becomes small. As a result, the positive electrode material mixture layer separates easily from the positive electrode current collector, increasing the possibility of the bare portion of the current collector coming into contact with the negative electrode active material. In other words, the possibility of excessive heat generation increases. If the positive electrode material mixture layer has a porosity of less than 15%, the charge/discharge performance becomes low, facilitating the degradation of battery characteristics over charge/discharge cycles.

The higher the porosity, the more likely the positive electrode material mixture layer will separate from the current collector, resulting in poor safety. For this reason, it is necessary to ensure safety by preventing the formation of a film derived from ethylene carbonate on the surface of the positive electrode active material. To achieve this end, it is preferred to reduce the volume percentage of ethylene carbonate in the electrolyte. At the same time, because the battery safety tends to increase as the porosity of the positive electrode material mixture layer is decreased, the volume percentage of ethylene carbonate may be increased to ensure charge/discharge performance of the battery as long as the volume percentage stays within an appropriate range. As used herein, the "appropriate range" means $150 \leq A \cdot B \leq 350$, where A represents the porosity (%) of the positive electrode material mixture layer and B represents the volume percentage of ethylene carbonate in the non-aqueous solvent.

A description is now given of a method for producing the non-aqueous electrolyte secondary battery of the present invention.

(i) Preparation of Positive Electrode Material Mixture Paste

A positive electrode material mixture paste is first prepared containing a positive electrode active material, a binder, a conductive material and a dispersing medium. The dispersing medium is preferably N-methyl-pyrrolidone (hereinafter simply referred to as NMP). Alternatively, a ketone such as acetone may be used. When the ketone is used, it is preferably used together with NMP.

The amount of the conductive material contained in the positive electrode material mixture paste is preferably 1 to 3 parts by weight per 100 parts by weight of the positive electrode active material. When the amount of the conductive material is not less than 1 part by weight, the decrease of electron conductivity of the positive electrode can be prevented, and thus the cycle life of the battery can be extended. Likewise, when the amount of the conductive material is not greater than 3 parts by weight, the decrease of battery capacity can be prevented.

(ii) Production of Positive Electrode

The positive electrode material mixture paste is applied onto both surfaces of a current collector serving as the positive electrode core member. The applied films are dried and rolled, whereby positive electrode material mixture layers are formed integrally with the current collector. The current collector having the positive electrode material mixture layers formed thereon is cut into a predetermined size. Thereby, a positive electrode is produced. The total thickness of the current collector and the positive electrode material mixture layers formed on both surfaces of the current collector is usually 80 to 200 μm.

(iii) Production of Negative Electrode

Examples of the negative electrode active material include a metal, a metal fiber, a carbon material, an oxide, a nitride, a tin compound, a silicon compound and various alloy materials. Examples of the carbon material include various natural graphites, coke, carbon under graphitization process, a carbon fiber, spherical carbon, various artificial graphites and amorphous carbon. Preferred is a simple substance of silicon (Si) or tin (Sn), an alloy or compound containing silicon or tin because these have high capacity density. A preferred example of silicon compound is $SiO_x$ ($0.05<x<1.95$). Also usable is a compound obtained by replacing part of silicon of the silicon compound with at least one element selected from the group consisting of B, Mg, Ni, Ti, Mo, Co, Ca, Cr, Cu, Fe, Mn, Nb, Ta, V, W, Zn, C, N and Sn. The tin compound can be $Ni_2Sn_4$, $Mg_2Sn$, $SnO_x$ ($0<x<2$), $SnO_2$ or $SnSiO_3$. The negative electrode active materials may be used singly or in any combination of two or more.

The method for producing the negative electrode is not specifically limited, and it may be a conventional method. For example, a negative electrode material mixture paste is first prepared containing a carbon material capable of absorbing and desorbing lithium ions and a binder. The negative electrode material mixture paste is then applied onto both surfaces of a current collector serving as the negative electrode core member. The applied films are dried and rolled, whereby negative electrode material mixture layers are formed integrally with the current collector. The current collector having the negative electrode material mixture layers formed thereon is cut into a predetermined size. Thereby, a negative electrode is produced. The total thickness of the current collector and the negative electrode material mixture layers formed on both surfaces of the current collector is usually 80 to 200 μm.

The binder for use in the negative electrode material mixture can be a styrene-butadiene copolymer (SBR), core-shell rubber particles, or fine particles of a polymer containing a polyacrylic acid unit. In order to impart favorable viscosity to the negative electrode material mixture paste, carboxymethyl cellulose or polyethylene oxide may be added. The amount of the binder contained in the negative electrode material mixture is preferably 1.5 to 4 parts by weight per 100 parts by weight of the carbon material. The negative electrode current collector can be a metal foil such as a copper foil. In order to achieve a smaller and lighter weight battery, the negative electrode current collector preferably has a thickness of 8 to 20 μm.

(iv) Assembly of Battery

A battery is then assembled using the positive electrode, the negative electrode and a non-aqueous electrolyte. First, the positive electrode and the negative electrode are spirally wound with a separator interposed therebetween to form an electrode group. During this step, if the electrodes and the separator are spirally wound into a cylinder, an electrode group for cylindrical battery is obtained. If the electrodes and the separator are spirally wound so as to have a substantially oval cross section, an electrode group for prismatic battery is obtained. The obtained electrode group is inserted into a battery case having a predetermined shape. A non-aqueous electrolyte is then injected into the battery case accommodating the electrode group. The opening of the battery case is then sealed. Thereby, a non-aqueous electrolyte secondary battery is produced.

The separator is preferably a microporous film made of polyolefin such as polyethylene or polypropylene. The separator usually has a thickness of 10 to 40 μm.

The non-aqueous electrolyte is not specifically limited, and any conventional electrolyte employed for non-aqueous electrolyte secondary batteries can be used. Normally and preferably used is an electrolyte prepared by dissolving a lithium salt in a non-aqueous solvent. The lithium salt can be, for example, $LiPF_6$, $LiBF_4$ or the like. They may be used singly or in a combination of two or more.

The non-aqueous solvent can be ethylene carbonate, propylene carbonate, dimethyl carbonate, diethyl carbonate, ethyl methyl carbonate or the like.

The non-aqueous electrolyte may further contain an additive for enhancing resistance to overcharge. A preferred example of such additive is a benzene derivative comprising a phenyl group and a hydrocarbon cyclic compound group adjacent to the phenyl group. Examples of such benzene derivative include biphenyl, cyclohexylbenzene, diphenyl ether and phenyl lactone.

The present invention is described in further detail below with reference to examples, but it should be understood that the present invention is not limited thereto.

EXAMPLE 1

(i) Production of Positive Electrode

A lithium nickel composite oxide (composition formula: $LiNi_{0.8}Cu_{0.15}Al_{0.05}O_2$) was used as the active material. A positive electrode material mixture paste was prepared according to the procedure described previously.

This positive electrode material mixture paste was applied onto both surfaces of a 15 μm thick current collector made of aluminum foil, which was then dried and rolled to form positive electrode material mixture layers integrally with the current collector. The resultant current collector is then cut into a size of 56 mm in width and 610 mm in length. Thereby, a positive electrode was produced. The total thickness of the aluminum foil and the positive electrode material mixture layers formed on both surfaces of the aluminum foil was 159 μm. The positive electrode material mixture layers had a porosity of 20%.

(ii) Production of Negative Electrode

A negative electrode material mixture paste was prepared by mixing 100 parts by weight of spherical natural graphite powder with 1 part by weight of BM-400B (trade name) (core-shell rubber particles containing an acrylonitrile group in the core and having a styrene group incorporated in the shell) available from Zeon Corporation, Japan, 1 part by weight of carboxymethyl cellulose and an appropriate amount of water.

This negative electrode material mixture paste was then applied onto both surfaces of a 10 μm thick current collector made of copper foil, which was then dried and rolled to form negative electrode material mixture layers integrally with the current collector. The resultant current collector is then cut into a size of 58 mm in width and 640 mm in length. Thereby, a negative electrode was produced.

(iii) Assembly of Battery

The positive electrode produced above was allowed to sit for one day. Thereafter, the positive electrode and the negative electrode were spirally wound with a 20 μm thick separator made of polypropylene interposed therebetween to form a columnar electrode group. The electrode group was then inserted into a cylindrical bottomed battery case, after which a non-aqueous electrolyte was injected into the battery case. The non-aqueous electrolyte used here was prepared by dissolving $LiPF_6$ in a non-aqueous solvent of ethylene carbonate (EC), dimethyl carbonate (DMC) and ethyl methyl carbonate (EMC) at a volume ratio of 10:20:70 at a $LiPF_6$ concentration of 1 mol/L. After the injection, the opening of the battery case was sealed with a sealing plate and a gasket. Thereby, a cylindrical lithium ion secondary battery having an outer diameter of 18 mm and a height of 65 mm was produced (nominal capacity: 2800 mAh).

EXAMPLE 2

A battery was produced in the same manner as in EXAMPLE 1 except that the proportions of DMC and EMC in the non-aqueous solvent were each decreased by 2.5%, and that the volume percentage of EC was changed to 15%.

EXAMPLE 3

A battery was produced in the same manner as in EXAMPLE 1 except that the proportions of DMC and EMC in the non-aqueous solvent were each increased by 1%, and that the volume percentage of EC was changed to 8%.

EXAMPLE 4

A battery was produced in the same manner as in EXAMPLE 1 except that the porosity of the positive electrode material mixture layer was changed to 15%.

EXAMPLE 5

A battery was produced in the same manner as in EXAMPLE 1 except that the porosity of the positive electrode material mixture layer was changed to 15%, that the proportions of DMC and EMC in the non-aqueous solvent were each decreased by 5%, and that the volume percentage of EC was changed to 20%.

EXAMPLES 6 AND 7

A battery of EXAMPLE 6 was produced in the same manner as in EXAMPLE 1 except that $LiCoO_2$ was added to the positive electrode active material in an amount of 10 wt %.

Likewise, a battery of EXAMPLE 7 was produced in the same manner as in EXAMPLE 2 except that $LiCoO_2$ was added to the positive electrode active material in an amount of 10 wt %.

COMPARATIVE EXAMPLE 1

A battery was produced in the same manner as in EXAMPLE 1 except that the proportions of DMC and EMC in the non-aqueous solvent were each decreased by 5%, and that the volume percentage of EC was changed to 20%.

COMPARATIVE EXAMPLE 2

A battery was produced in the same manner as in EXAMPLE 1 except that the porosity of the positive electrode material mixture layer was changed to 15%, that the proportions of DMC and EMC in the non-aqueous solvent were each decreased by 7.5%, and that the volume percentage of EC was changed to 25%.

COMPARATIVE EXAMPLE 3

A battery was produced in the same manner as in EXAMPLE 1 except that the porosity of the positive electrode material mixture layer was changed to 10%, that the proportions of DMC and EMC in the non-aqueous solvent were each decreased by 7.5%, and that the volume percentage of EC was changed to 25%.

COMPARATIVE EXAMPLE 4

A battery was produced in the same manner as in EXAMPLE 1 except that the porosity of the positive electrode material mixture layer was changed to 25%.

COMPARATIVE EXAMPLE 5

A battery was produced in the same manner as in EXAMPLE 1 except that the proportions of DMC and EMC in the non-aqueous solvent were each increased by 2.5%, and that the volume percentage of EC was changed to 5%.

Evaluation

The batteries produced in EXAMPLEs 1 to 6 and COMPARATIVE EXAMPLEs 1 to 4 were evaluated by the following tests.

(Nail Penetration Test)

Each battery was charged to 4.25 V, and then subjected to nail penetration test. In the nail penetration test, the charged battery was placed horizontally. A nail made of stainless steel was penetrated through the center of the battery using a hydraulic press. The results are shown in Table 1.

(Cycle Test)

After assembled, each battery was subjected to cycle test in an environment of 25° C. in the following procedure. The results are shown in Table 1.

1) Constant current-constant voltage charge: each battery was charged at a constant current of 1960 mA until the battery voltage reached 4.2 V. Then, the battery was charged at a constant voltage of 4.2 V until the current decreased to 140 mA.

2) Constant current discharge: the battery was discharged at a constant current of 2800 mA until the battery voltage decreased to 2.5 V.

TABLE 1

|  | Active material (wt %) | | Porosity A (%) | Volume percentage of EC B (%) | A · B | Battery temperature in nail penetration test | Number of cycles |
| --- | --- | --- | --- | --- | --- | --- | --- |
|  | Active material 1 | Active material 2 | | | | | |
| Ex. 1 | 100 | 0 | 20 | 10 | 200 | 83 | 510 |
| Ex. 2 | 100 | 0 | 20 | 15 | 300 | 113 | 620 |
| Ex. 3 | 100 | 0 | 20 | 8 | 160 | 75 | 400 |
| Ex. 4 | 100 | 0 | 15 | 10 | 150 | 69 | 410 |
| Ex. 5 | 100 | 0 | 15 | 20 | 300 | 115 | 590 |
| Ex. 6 | 90 | 10 | 20 | 10 | 200 | 74 | 530 |
| Ex. 7 | 90 | 10 | 20 | 15 | 300 | 82 | 645 |
| Comp. Ex. 1 | 100 | 0 | 20 | 20 | 400 | 140 | 690 |
| Comp. Ex. 2 | 100 | 0 | 15 | 25 | 375 | 132 | 650 |
| Comp. Ex. 3 | 100 | 0 | 10 | 25 | 250 | 103 | 180 |
| Comp. Ex. 4 | 100 | 0 | 25 | 10 | 250 | 133 | 370 |
| Comp. Ex. 5 | 100 | 0 | 20 | 5 | 100 | 79 | 190 |

Note:
Active material 1: $LiNi_{0.8}Co_{0.15}Al_{0.05}O_2$
Active material 2: $LiCoO_2$ The results are discussed below.

When the positive electrode material mixture layer had a preferred porosity of 20%, favorable results were obtained. However, the battery of COMPARATIVE EXAMPLE 1, in which the product of porosity A and volume percentage B of EC in the non-aqueous solvent equaled 400, generated excessive heat in the nail penetration test. Although both the porosity and the volume percentage of EC were within the appropriate range, because the product thereof was large, the positive electrode material mixture layer easily separated from the current collector. Accordingly, it is preferred to set the porosity A and the volume percentage B of EC such that the product A·B falls within a range from 150 to 350 as in EXAMPLEs 1, 2 and 3.

When the porosity of the positive electrode material mixture layer was reduced to 15%, similar to the above, the battery of COMPARATIVE EXAMPLE 2, in which the volume percentage of EC was increased to 25%, generated excessive heat in the nail penetration test. In this comparative example, the porosity was reduced to prevent the positive electrode material mixture layer from separating from the current collector. However, because the volume percentage of EC was high, a thick film was formed on the active material surface, so that the separation of the material mixture layer was not prevented. Accordingly, even when the porosity is reduced, it is preferred to set the volume percentage of EC such $150 \leq A \cdot B \leq 350$ is satisfied as in EXAMPLEs 4 and 5.

In COMPARATIVE EXAMPLE 3 in which the porosity of the positive electrode material mixture layer was reduced to 10%, excessive heat generation was not observed in the nail penetration test. This is presumably because the positive electrode active material was sufficiently embedded in the positive electrode current collector, and the separation of the positive electrode material mixture layer was successfully prevented. As a result, the positive electrode current collector and the negative electrode material mixture did not come into contact with each other in the nail penetration test. However, the cycle characteristic of COMPARATIVE EXAMPLE 3 was extremely low. This is presumably because the porosity of the positive electrode material mixture layer was small, the active material surface was not sufficiently wet with the electrolyte, resulting in a degradation in charge/discharge performance. From this, it can be seen that the porosity of the positive electrode material mixture layer is preferably set to not less than 15%.

When the porosity was increased to 25% as in COMPARATIVE EXAMPLE 4, no matter how much the volume percentage of EC was reduced, it did not prevent excessive heat generation in the nail penetration test. This is presumably because the degree to which the active material was embedded in the current collector was small, and therefore the positive electrode material mixture layer was in a condition easily separable from the current collector. Accordingly, the porosity is preferably set to not greater than 20%.

As is clear from the results of EXAMPLEs 6 and 7, the positive electrode active material is not necessarily a nickel-containing oxide alone, and may further contain a small amount of $LiCoO_2$ When the volume percentage of EC was reduced to 5% as in COMPARATIVE EXAMPLE 5, the cycle characteristics extremely degraded. This is presumably because the reactivity between the active material and the electrolyte was not ensured sufficiently, impairing the charge/discharge performance. Accordingly, as can be seen from EXAMPLE 3, the volume percentage of EC should preferably be 8% or greater.

According to the present invention, it is possible to prevent excessive heat generation of a non-aqueous electrolyte secondary battery resulting from the contact between the positive electrode current collector and the negative electrode active material in the event of a short-circuit. The non-aqueous electrolyte secondary battery of the present invention is useful as a power source for various electronics including cell phones.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising:
   an electrode group in which a positive electrode and a negative electrode are spirally wound with a separator interposed therebetween; and
   a non-aqueous electrolyte comprising a non-aqueous solvent and a lithium salt dissolved in said non-aqueous solvent,
   said positive electrode including a positive electrode material mixture layer comprising a nickel-containing lithium composite metal oxide and $LiCoO_2$ as active materials,
   wherein a product of A and B equals 150 to 300, A equals 15 to 20%, and B equals 8 to 15%, where A (%) represents a porosity of said positive electrode material mixture layer, and B (%) represents a volume percentage of ethylene carbonate in said non-aqueous solvent.

2. The non-aqueous electrolyte secondary battery in accordance with claim 1, wherein said nickel-containing lithium composite metal oxide is represented by a formula:
   $LiNi_xM_yL_zO_2$, where M is at least one of Co and Mn, L is at least one selected from the group consisting of Al, Mg, Ca, Si and Ti, $0.3 \leq x \leq 0.9$, $0.1 \leq y \leq 0.5$, and $0.005 \leq z \leq 0.1$.

* * * * *